United States Patent
Nishizaki et al.

(10) Patent No.: US 11,102,845 B2
(45) Date of Patent: Aug. 24, 2021

(54) WIRELESS COMMUNICATION DEVICE

(71) Applicant: Yazaki Corporation, Tokyo (JP)

(72) Inventors: Ryohei Nishizaki, Shizuoka (JP); You Yanagida, Shizuoka (JP); Takahiro Iwaki, Shizuoka (JP); Eita Itou, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/823,838

(22) Filed: Mar. 19, 2020

(65) Prior Publication Data

US 2020/0221544 A1 Jul. 9, 2020

Related U.S. Application Data

(63) Continuation of application No. PCT/JP2018/020927, filed on May 31, 2018.

(30) Foreign Application Priority Data

Oct. 24, 2017 (JP) .............................. JP2017-205588

(51) Int. Cl.
*H04W 88/06* (2009.01)
*H04W 4/40* (2018.01)
(Continued)

(52) U.S. Cl.
CPC ............. *H04W 88/06* (2013.01); *H04W 4/40* (2018.02); *H04W 12/06* (2013.01); *H04W 12/08* (2013.01); *H04W 48/18* (2013.01); *H04W 84/12* (2013.01)

(58) Field of Classification Search
CPC ....... H04W 4/40; H04W 88/06; H04W 12/06; H04W 12/08; H04W 48/18; H04W 84/12;
(Continued)

(56) References Cited

U.S. PATENT DOCUMENTS

| 7,769,898 B2 | 8/2010 | Morinaga |
| 2008/0201489 A1 | 8/2008 | Morinaga |

(Continued)

FOREIGN PATENT DOCUMENTS

| JP | 2002-261790 A | 9/2002 |
| JP | 2004-349780 A | 12/2004 |

(Continued)

OTHER PUBLICATIONS

Japanese Notice of Reasons for Refusal for 2017-205588 dated Feb. 25, 2020.

(Continued)

*Primary Examiner* — Brandon J Miller
(74) *Attorney, Agent, or Firm* — Sughrue Mion, PLLC

(57) ABSTRACT

In an in-vehicle router, a narrow-range communication module (10A) is a device capable of wireless communication. A wide-range communication module is a device capable of wireless communication in the wider range than the narrow-range communication module. An Ethernet module is connected to an in-vehicle LAN in a vehicle so that communication is possible. A CPU controls the narrow-range communication module and the wide-range communication module and communicates with the in-vehicle LAN through the Ethernet module. The narrow-range communication module, the wide-range communication module, the Ethernet module, and the CPU are assembled to a housing, and the housing is provided to the vehicle.

8 Claims, 5 Drawing Sheets

(51) Int. Cl.
*H04W 12/06* (2021.01)
*H04W 12/08* (2021.01)
*H04W 48/18* (2009.01)
*H04W 84/12* (2009.01)

(58) Field of Classification Search
CPC ........... H04W 4/90; H04W 4/02; H04W 4/48;
H04W 4/80; H04W 36/30; H04W 36/08;
H04L 63/0861
See application file for complete search history.

(56) References Cited

U.S. PATENT DOCUMENTS

| | | | |
|---|---|---|---|
| 2013/0238807 A1* | 9/2013 | Wakikawa | H04W 48/18 |
| | | | 709/227 |
| 2017/0041950 A1* | 2/2017 | Wang | H04W 48/10 |
| 2018/0020393 A1* | 1/2018 | Karlsson | H04M 3/2281 |
| 2018/0213541 A1* | 7/2018 | Riess | H01Q 21/30 |

FOREIGN PATENT DOCUMENTS

| | | |
|---|---|---|
| JP | 2005-277537 A | 10/2005 |
| JP | 2006-005658 A | 1/2006 |
| JP | 2006-333530 A | 12/2006 |
| JP | 2008205808 A | 9/2008 |
| JP | 2010-093347 A | 4/2010 |

OTHER PUBLICATIONS

International Search Report for PCT/JP2018/020927 dated Jul. 17, 2018 (PCT/ISA/210).

\* cited by examiner

WIRELESS COMMUNICATION DEVICE

CROSS-REFERENCE TO RELATED APPLICATION(S)

This application is a continuation of PCT International Application No. PCT/JP2018/020927 filed on May 31, 2018 which claims the benefit of priority from Japanese Patent Application No. 2017-205588 filed on Oct. 24, 2017, the entire contents of which are incorporated herein by reference.

BACKGROUND OF THE INVENTION

1. Field of the Invention

The present invention relates to a wireless communication device.

2. Description of the Related Art

One example of the conventional wireless communication devices is an information communication system disclosed in Japanese Patent Application Laid-open No. 2006-5658 that is mounted in a vehicle and communicates with an external data center. This information communication system includes a narrow-range communication module and a wide-range communication module, and by selectively switching the communication modules, communicates with the data center.

Incidentally, for example, as the above information communication system according to the Patent Literature 1 includes more communication modules, the limited mount space may be fully occupied and the control of each communication module may become complicated.

SUMMARY OF THE INVENTION

The present invention has been made in view of the above circumstance, and an object is to provide a wireless communication device that can control each communication module with the mount property improved as appropriate.

In order to solve the problem and achieve the above objection, a wireless communication device according to one aspect of the present invention includes a narrow-range communication module capable of wireless communication; a wide-range communication module capable of wireless communication in a wider range than the narrow-range communication module; a connection part connected to a communication network in a vehicle so that communication is possible; a controller that controls the narrow-range communication module and the wide-range communication module and communicates with the communication network through the connection part; and a housing to which the narrow-range communication module, the wide-range communication module, the connection part, and the control unit are assembled, the housing being to be provided to the vehicle, wherein the controller includes a priority controller that controls the narrow-range communication module and the wide-range communication module on the basis of an order of priority of communication that is set in advance, and the priority controller controls the narrow-range communication module and the wide-range communication module in accordance with the kind of communication data as the order of priority.

According to another aspect of the present invention, in the wireless communication device, it is preferable that the narrow-range communication module includes a plurality of communication modules with different communication standards, and the wide-range communication module includes a plurality of communication modules with different communication standards.

According to still another aspect of the present invention, in the wireless communication device, it is preferable that the narrow-range communication module includes a first narrow-range communication module and a second narrow-range communication module with the same communication standard as the first narrow-range communication module, and the controller includes a switching part that controls to connect one of the first narrow-range communication module and the second narrow-range communication module to a first access point for communication relay so that communication is possible, and cause the other of the first narrow-range communication module and the second narrow-range communication module to prepare to connect to a second access point for communication relay, the second access point being adjacent to the first access point.

According to still another aspect of the present invention, in the wireless communication device, it is preferable that if the kind of data is the communication data whose data size is relatively large, the priority controller prioritizes the narrow-range communication module over the wide-range communication module.

According to still another aspect of the present invention, in the wireless communication device, it is preferable that if the emergency call request indicating an emergency of the vehicle is input to the priority controller, the priority controller controls the narrow-range communication module and the wide-range communication module on the basis of an order of priority for an emergency call provided separately.

According to still another aspect of the present invention, in the wireless communication device, it is preferable that the controller includes an authentication part that authenticates at least one of an occupant and a connection device before use, and a restriction part that restricts use of the narrow-range communication module and the wide-range communication module on the basis of an authenticated result by the authentication part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode (embodiment) for carrying out the present invention is described in detail with reference to the attached drawings. The present invention is not limited by the content described in the embodiment below. The component described below includes the component that is easily conceived by a person skilled in the art and the component that is substantially the same. In addition, the structures below can be combined with each other as appropriate. Moreover, the structure can be variously omitted, replaced, and changed within the range not departing from the concept of the present invention.

Embodiment

Figure 1:
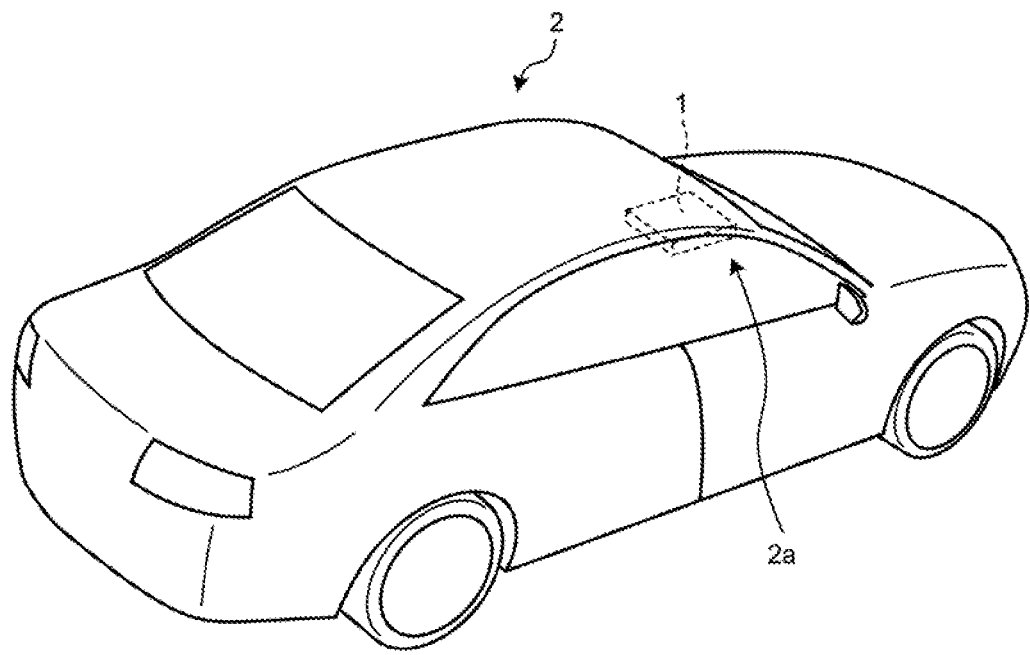
FIG. 1 is a schematic diagram illustrating an installation example of a wireless communication device according to one embodiment.
Figure 2:
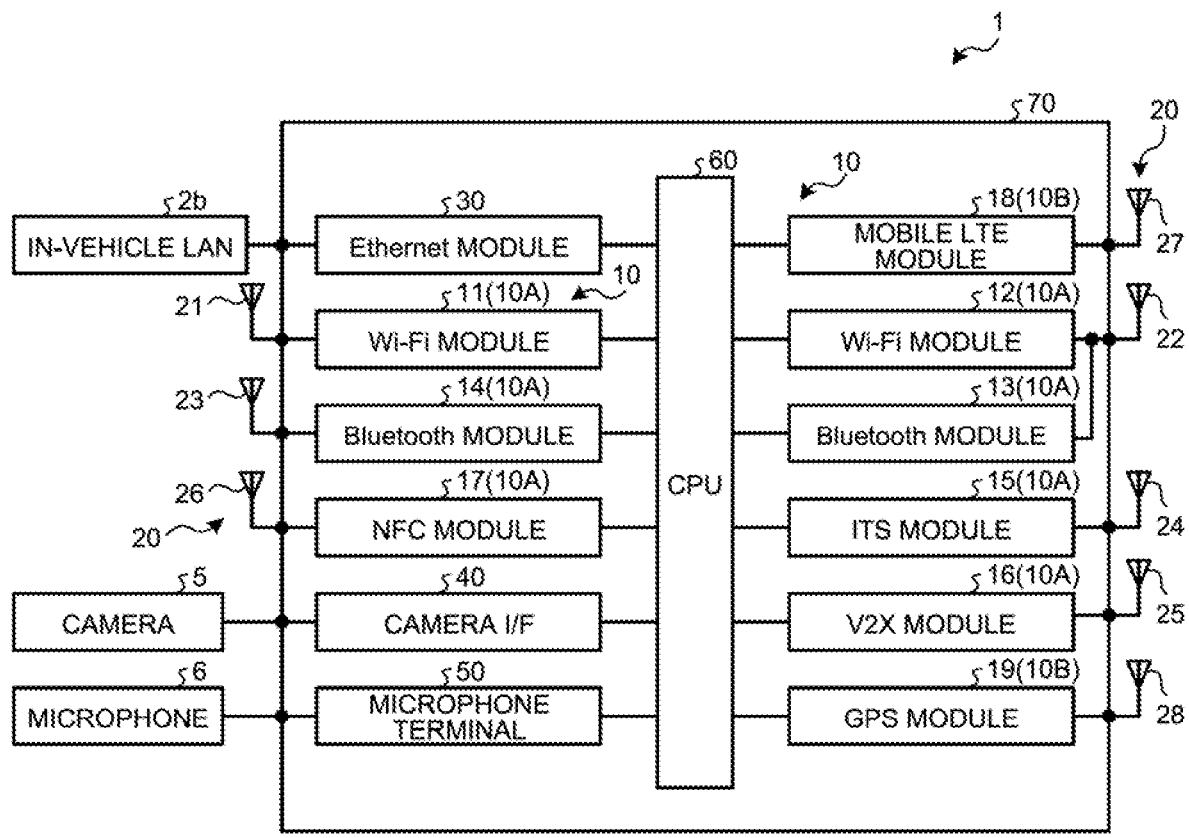
FIG. 2 is a block diagram illustrating a structure example of the wireless communication device according to one embodiment.

An in-vehicle router 1 serving as a wireless communication device according to one embodiment is described. The in-vehicle router 1 has a plurality of communication modules 10 contained in a housing 70, and performs wireless communication through each communication module 10. The in-vehicle router 1 is provided in a vehicle 2 as illustrated in FIG. 1. The in-vehicle router 1 is, for example, provided to an instrument panel 2a of the vehicle 2. As illustrated in FIG. 2, the in-vehicle router 1 includes a narrow-range communication module 10A, a wide-range communication module 10B, an antenna unit 20, an Ethernet (registered trademark) module 30 serving as a connection part, a camera I/F 40, a microphone terminal 50, a CPU 60 serving as a controller, a storage unit that is not illustrated, and the housing 70. In the description below, the narrow-range communication module 10A and the wide-range communication module 10B may collectively be referred to as the communication module 10.

The narrow-range communication module 10A is a communication module capable of wireless communication in a narrow range. Here, the narrow range is a region where the communication distance is in the range of about 1 cm to 300 m. The narrow-range communication module 10A includes a plurality of communication modules whose communication standards are different. The narrow-range communication module 10A includes, for example, a Wi-Fi module 11 serving as a first narrow-range communication module, a Wi-Fi module 12 serving as a second narrow-range communication module, Bluetooth modules 13 and 14, an ITS (Intelligent Transport Systems) module 15, a V2X (Vehicle to Everything) module 16, and an NFC (Near Field Communication) module 17. Note that "Wi-Fi" and "Bluetooth" are registered trademarks. The Wi-Fi modules 11 and 12 are wireless communication devices based on the standard specification of wireless LAN (Local Area Network). The Wi-Fi module 11 and the Wi-Fi module 12 are based on the same communication standard. Each of the Wi-Fi modules 11 and 12 communicates with an access point 3 for relaying communication (see FIG. 4). Here, the access point 3 corresponds to a relay point to connect to an external communication network (Internet) 8 operated by a communication service provider or the like. The access point 3 enables the communication with each of the Wi-Fi modules 11 and 12 in a predetermined range. Each of the Wi-Fi modules 11 and 12 is connected to the antenna unit 20 and the CPU 60, and outputs a reception signal received from the access point 3 through the antenna unit 20 to the CPU 60. Moreover, each of the Wi-Fi modules 11 and 12 transmits a transmission signal output from the CPU 60, to the access point 3 through the antenna unit 20.

The Bluetooth modules 13 and 14 are wireless communication devices that wirelessly communicate with a mobile terminal or a sensor S (see FIG. 6) within a short distance. Each of the Bluetooth modules 13 and 14 is connected to the antenna unit 20 and the CPU 60, and for example, outputs the reception signal received from the sensor S through the antenna unit 20 to the CPU 60. Moreover, each of the Bluetooth modules 13 and 14 transmits the transmission signal output from the CPU 60, to the mobile terminal through the antenna unit 20.

The ITS module 15, for example, communicates with a road-side device 9 (see FIG. 6) provided along a road or the like so as to charge the vehicle 2, assist the automated driving, assist the safe driving, or control the traffic. The ITS module 15 includes ETC (Electronic Toll Collection), DSRC (Dedicated Short Range Communications), or the like. The ITS module 15 is connected to the antenna unit 20 and the CPU 60, and outputs the reception signal received from the road-side device 9 through the antenna unit 20 to the CPU 60. The ITS module 15 transmits the transmission signal output from the CPU 60, to the road-side device 9 through the antenna unit 20.

The V2X module 16 is a wireless communication device that communicates with another vehicle or the road-side device 9 provided along the road, for example. The V2X module 16 is connected to the antenna unit 20 and the CPU 60, and for example, outputs the reception signal received from another vehicle or the like through the antenna unit 20 to the CPU 60. In addition, the V2X module 16 transmits the transmission signal output from the CPU 60, to another vehicle or the like through the antenna unit 20.

The NFC module 17 is a wireless communication device that performs wireless communication in the near field. The NFC module 17 is connected to the antenna unit 20 and the CPU 60, and outputs the reception signal received from the mobile terminal or the like through the antenna unit 20 to the CPU 60. In addition, the NFC module 17 transmits the transmission signal output from the CPU 60, to the mobile terminal or the like through the antenna unit 20.

The wide-range communication module 10B is a communication module capable of wireless communication in a wider range than the narrow-range communication module 10A. Here, the wide range refers to a region where the communication distance is about 3 km to 30 km. The wide-range communication module 10B includes a plurality of communication modules whose communication standards are different. The wide-range communication module 10B includes, for example, a mobile LTE (Long Term Evolution) module 18, and a GPS (Global Positioning System) module 19.

The mobile LTE module 18 is a wireless communication device based on the wireless communication standard whose specification is defined in accordance with 3GPP (3rd Generation Partnership Project). The mobile LTE module 18 communicates with a base station 4 (see FIG. 4) for relaying the communication. Here, the base station 4 is a relay point used to connect to an external communication network 8 that is operated by a communication service provider or the like. The base station 4 communicates with the mobile LTE module 18 in a wider range R3 than the access point 3 of the Wi-Fi modules 11 and 12. That is to say, each base station 4 covers a wider range than each access point 3. Thus, the base station 4 can construct a communication network with the wider range R3 than the access point 3. The mobile LTE module 18 is connected to the antenna unit 20 and the CPU 60, and outputs the reception signal received from the base station 4 through the antenna unit 20 to the CPU 60. In addition, the mobile LTE module 18 transmits the transmission signal output from the CPU 60, to the base station 4 through the antenna unit 20.

The GPS module 19 is a wireless communication device that obtains the current position on the basis of the reception signal including the positional information or the like transmitted from the GPS satellite. The GPS module 19 is connected to the antenna unit 20 and the CPU 60, and outputs to the CPU 60, the information about the current position on the basis of the reception signal received from the GPS satellite through the antenna unit 20.

The antenna unit 20 transmits and receives a radio wave. The antenna unit 20 includes a plurality of antennas 21 to 28. Each of the antennas 21 to 28 is formed by, for example, a linear antenna or a planar antenna. If each of the antennas 21 to 28 is the linear antenna, for example, the antenna is provided outside the housing 70 and through a communication line and an antenna connection port of the housing 70, connected to each communication module 10. If each of the antennas 21 to 28 is the planar antenna, for example, the antenna is provided inside the housing 70 and through a communication line, connected to each communication module 10. The planar antenna may be provided either to a substrate or to the housing 70 by printing or the like. The planar antenna provided inside the housing 70 is less influenced by an external impact and thus, has the high reliability. In addition, the planar antenna can make the housing 70 shorter and contribute to the improvement of the mount property of the housing 70. The antenna unit 20 includes, for example, the antenna 21 for the Wi-Fi module 11, the antenna 22 for the Wi-Fi module 12 and the Bluetooth module 13, the antenna 23 for the Bluetooth module 14, the antenna 24 for the ITS module 15, the antenna 25 for the V2X module 16, the antenna 26 for the NFC module 17, the antenna 27 for the mobile LTE module 18, and the antenna 28 for the GPS module 19.

The antenna 21 is connected to the Wi-Fi module 11, and transmits the transmission signal output from the Wi-Fi module 11, to the access point 3. In addition, the antenna 21 receives the signal transmitted from the access point 3 and outputs the received signal to the Wi-Fi module 11. The antenna 22 is connected to the Wi-Fi module 12, and transmits the transmission signal output from the Wi-Fi module 12, to the access point 3. The antenna 22 receives the signal transmitted from the access point 3 and outputs the received signal to the Wi-Fi module 12. The antenna 22 is further connected to the Bluetooth module 13, and transmits the transmission signal output from the Bluetooth module 13, to the mobile terminal or the like. In addition, the antenna 22 receives the signal transmitted from the sensor S or the like, and outputs the received signal to the Bluetooth module 13. The antenna 23 is connected to the Bluetooth module 14, and transmits the transmission signal output from the Bluetooth module 14, to the mobile terminal or the like. Moreover, the antenna 23 receives the signal transmitted from the sensor S or the like and outputs the received signal to the Bluetooth module 14.

The antenna 24 is connected to the ITS module 15, and transmits the transmission signal output from the ITS module 15, to the road-side device 9. The antenna 24 receives the signal transmitted from the road-side device 9, and outputs the received signal to the ITS module 15. The antenna 25 is connected to the V2X module 16, and transmits the transmission signal output from the V2X module 16, to another vehicle or the like. In addition, the antenna 25 receives the signal transmitted from another vehicle or the like and outputs the received signal to the V2X module 16. The antenna 26 is connected to the NFC module 17, and transmits the transmission signal output from the NFC module 17, to the mobile terminal or the like. Moreover, the antenna 26 receives the signal transmitted from the mobile terminal or the like and outputs the received signal to the NFC module 17. The antenna 27 is connected to the mobile LTE module 18, and transmits the transmission signal output from the mobile LTE module 18, to the base station 4. In addition, the antenna 27 receives the signal transmitted from the base station 4, and outputs the received signal to the mobile LTE module 18. The antenna 28 is connected to the GPS module 19, receives the signal transmitted from the GPS satellite, and outputs the received signal to the GPS module 19.

The Ethernet module 30 is a device based on the communication standard of LAN by IEEE-SA (Standards of Association). The Ethernet module 30 is connected to, for example, the CPU 60 and an in-vehicle LAN 2b corresponding to the communication network in the vehicle 2 with a wire. The Ethernet module 30 outputs the signal output from the in-vehicle LAN 2b, to the CPU 60. In addition, the Ethernet module 30 outputs the signal output from the CPU 60, to the in-vehicle LAN 2b.

The camera I/F 40 is an interface unit to which a camera 5 is connected. The camera 5 is a device that captures an image. The camera 5 outputs an image capture signal resulting from the capture of an occupant's face, to the camera I/F 40, for example. The camera I/F 40 is connected to the CPU 60, and outputs the image capture signal output from the camera 5, to the CPU 60.

The microphone terminal 50 is a terminal to which a microphone 6 is connected. The microphone 6 is a device that converts sound into electric signals. The microphone 6 outputs a sound signal, which is obtained by converting the occupant's voice into an electric signal, to the microphone terminal 50. The microphone terminal 50 is connected to the CPU 60, and outputs the sound signal output from the microphone 6, to the CPU 60.

Figure 3:
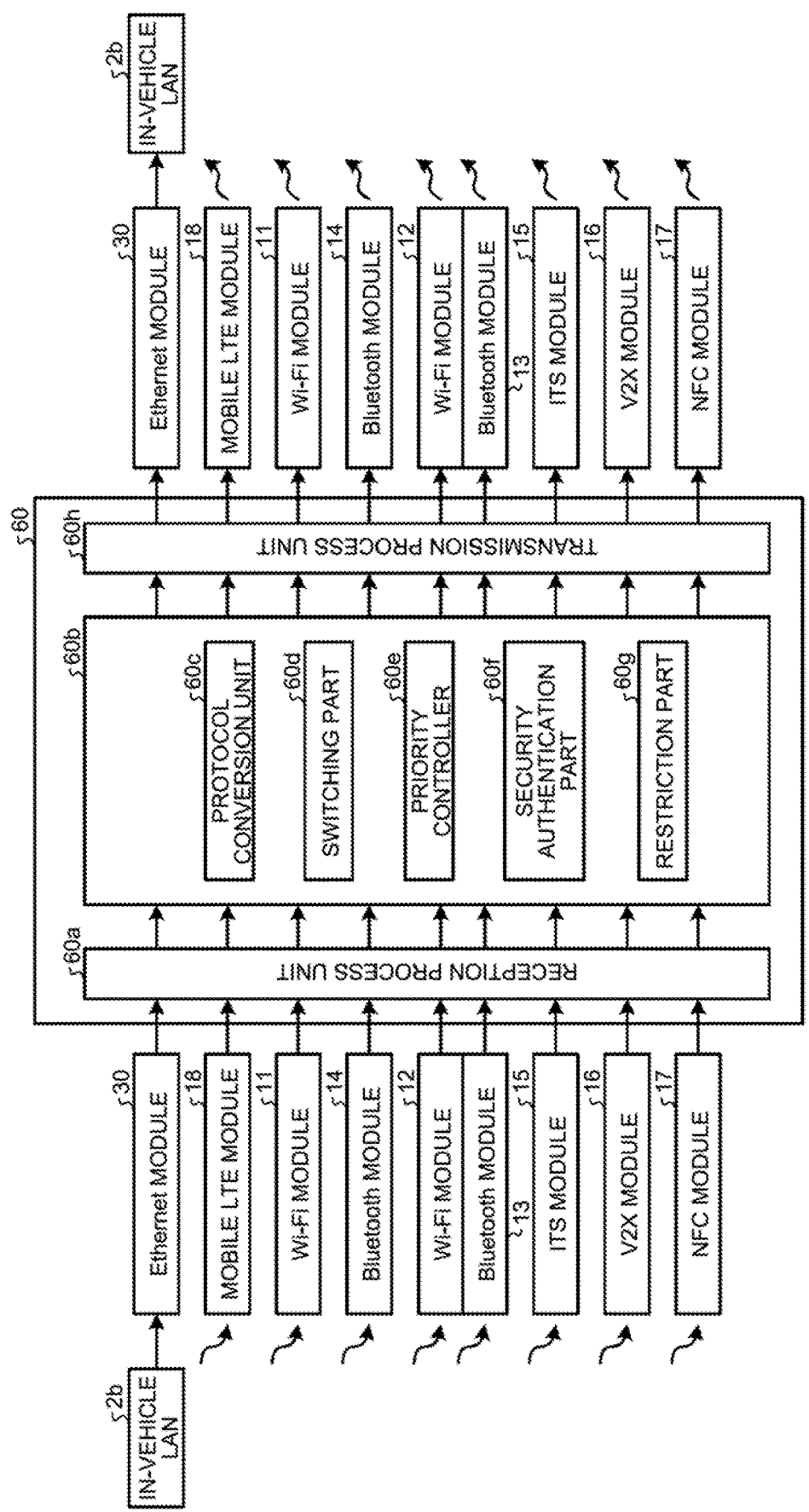
FIG. 3 is a diagram illustrating an internal process of the wireless communication device according to one embodiment.

The CPU 60 controls each communication module 10. The CPU 60 is connected to each communication module 10, and transmits and receives signals to and from each communication module 10. The CPU 60 includes, for example, a reception process unit 60a, a signal process unit 60b, and a transmission process unit 60h as illustrated in FIG. 3. The reception process unit 60a receives the signal output from the Ethernet module 30 and each communication module 10. The reception process unit 60a outputs the received signal to the signal process unit 60b. The signal process unit 60b processes the signal. The signal process unit 60b processes the signal output from the reception process unit 60a. The signal process unit 60b includes, for example, a protocol conversion unit 60c, a switching part 60d, a priority controller 60e, a security authentication part 60f as an authentication part, and a restriction part 60g. The protocol conversion unit 60c converts the signal into a predetermined communication protocol. The protocol conversion unit 60c converts the signal output from the reception process unit 60a into a predetermined communication protocol, and outputs the converted signal to the transmission process unit 60h. The switching part 60d switches between the Wi-Fi module 11 and the Wi-Fi module 12. The switching part 60d switches between the Wi-Fi module 11 and the Wi-Fi module 12 in accordance with the access point 3. The priority controller 60e controls the communication route of each communication module 10 on the basis of the order of priority of the communication that is set in advance. The priority controller 60e decides the communication route of the signal output from the reception process unit 60a on the basis of the order of priority of communication, and outputs the information expressing the communication route to the transmission process unit 60h. The security authentication part 60f performs the authentication for the purpose of securing the security. The security authentication part 60f authenticates at least one of the occupant and the devices 7a to 7d (see FIG. 6) as the connection device before the in-vehicle router 1 is used. The restriction part 60g restricts the use of each communication module 10. The restriction part 60g restricts the use of each communication module 10 on the basis of the result of the authentication by the security authentication part 60f. The transmission process unit 60h transmits the signal processed by the signal process unit 60b. The transmission process unit 60h outputs the signal processed by the signal process unit 60b to each communication module 10 or the Ethernet module 30.

The storage unit stores data for the communication, various computer programs for the communication, and the like. The storage unit saves a list of access points 3 that the Wi-Fi modules 11 and 12 can access, for example.

To the housing 70, the narrow-range communication module 10A, the wide-range communication module 10B, the Ethernet module 30, the camera I/F 40, the microphone terminal 50, and the CPU 60 are assembled. The housing 70 is formed of synthetic resin, for example, and includes an internal space part. In this internal space part, the housing 70 houses the narrow-range communication module 10A, the wide-range communication module 10B, and the CPU 60. That is to say, the housing 70 houses the Wi-Fi modules 11 and 12, the Bluetooth modules 13 and 14, the ITS module 15, the V2X module 16, the NFC module 17, the mobile LTE module 18, the GPS module 19, and the CPU 60 in the internal space part. Then, the housing 70 is assembled so that camera I/F 40 is connectable to the camera 5 and the microphone terminal 50 is connectable to the microphone 6. Moreover, the housing 70 is assembled so that the Ethernet module 30 can communicate with the in-vehicle LAN 2b. The housing 70 includes, for example, a connection port to be connected to the in-vehicle LAN 2b. The housing 70 houses the Ethernet module 30 in the internal space part, and connects between the Ethernet module 30 and the connection port so that the communication therebetween is possible. By the connection between the connection port and the in-vehicle LAN 2b through the communication line in the housing 70, the Ethernet module 30 and the in-vehicle LAN 2b are connected to each other so that the communication therebetween is possible.

Figure 4:
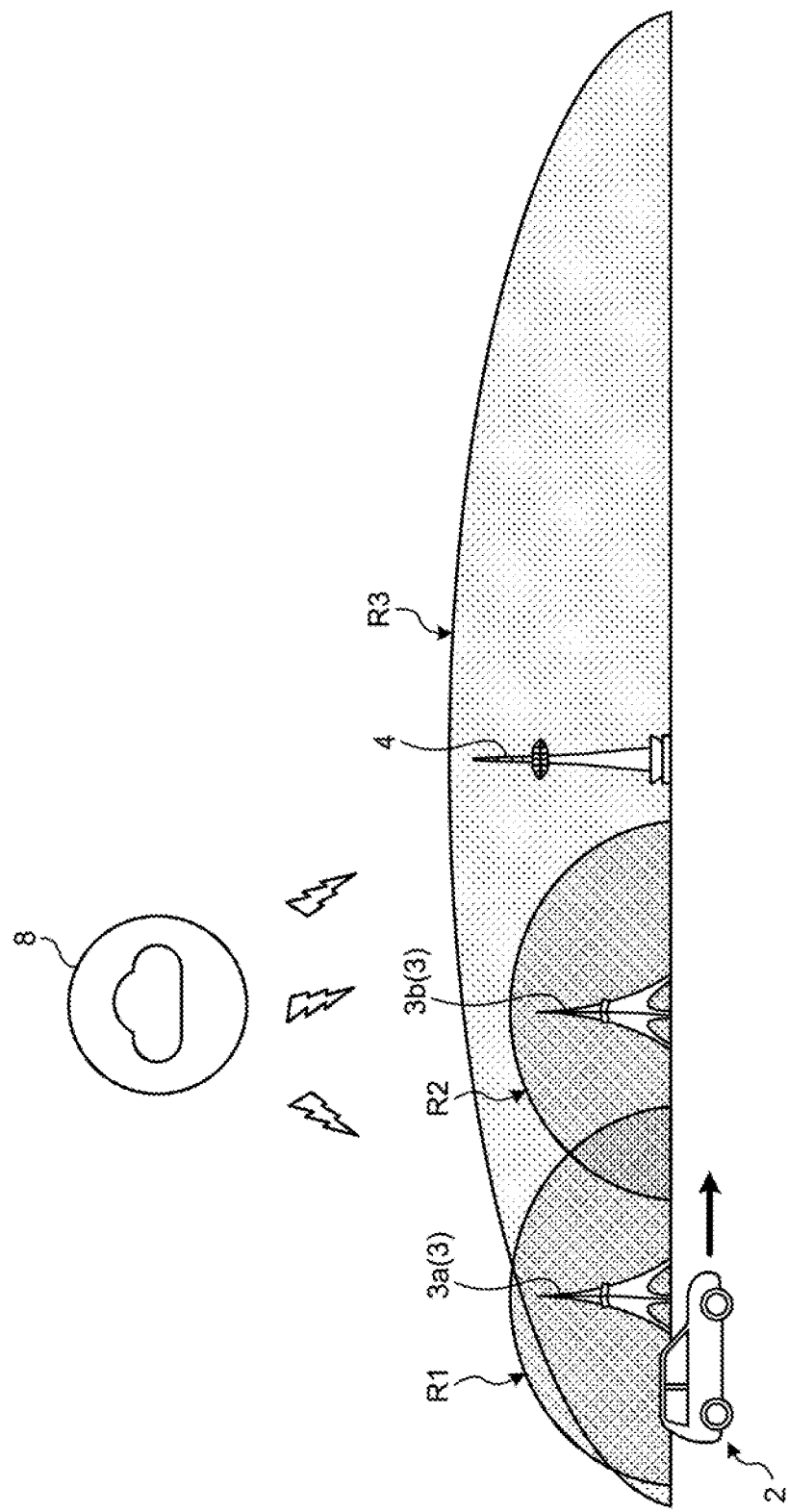
FIG. 4 is a diagram illustrating a communication example of the wireless communication device according to one embodiment.
Figure 5:
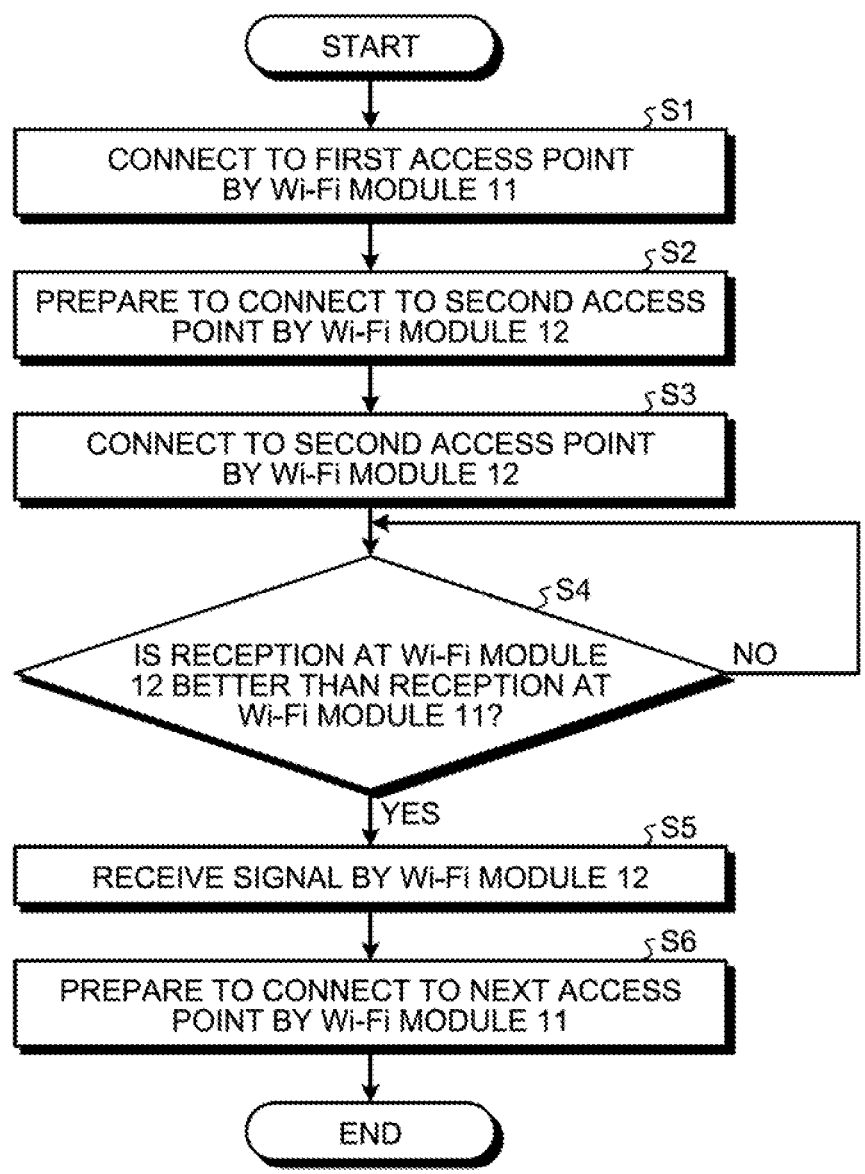
FIG. 5 is a flowchart illustrating the communication example of the wireless communication device according to one embodiment.

Next, with reference to FIG. 4 and FIG. 5, the communication example of the in-vehicle router 1 is described. In the example described here, the communication is performed by the two Wi-Fi modules 11 and 12. The in-vehicle router 1 is activated when an IG (ignition) power or an ACC (accessory) power is turned on. For example, as illustrated in FIG. 4, the vehicle 2 belongs to a region R1 where the Wi-Fi module 11 can exchange data with a first access point 3a. Here, the switching part 60d of the in-vehicle router 1 connects to the first access point 3a by the Wi-Fi module 11 and receives a signal (actual data such as moving picture) (step S1). Next, the switching part 60d prepares to connect to a second access point 3b adjacent to the first access point 3a by the Wi-Fi module 12 (step S2). The switching part 60d searches for the access point 3 where the communication is possible by the Wi-Fi module 12. For example, the Wi-Fi module 12 connects to the access point 3 included in the list of access points 3 saved in the storage unit. Since the Wi-Fi module 12 connects to the access point 3 included in the list of access points 3 that are determined in advance where the safety is secured, the security is enhanced. When the vehicle 2 has entered a region R2 where the Wi-Fi module 12 can communicate with the second access point 3b included in the list of access points 3, for example, the Wi-Fi module 12 receives a signal (beacon) that is transmitted from the second access point 3b regularly. After receiving the beacon, the Wi-Fi module 12 asks the second access point 3b whether the network identification (ESS-ID) is correct. After knowing that the network identification is correct, the Wi-Fi module 12 applies to the second access point 3b for the authentication for connecting to the second access point 3b. The second access point 3b performs the authentication of the connection to the Wi-Fi module 12 by a predetermined authentication method. After the connection to the second access point 3b is authenticated successfully, the Wi-Fi module 12 requests to connect to the second access point 3b (association request). When the association request has been permitted by the second access point 3b, the connection between the Wi-Fi module 12 and the second access point 3b is completed (step S3).

Next, the switching part 60d compares the reception at the Wi-Fi module 11 and the reception at the Wi-Fi module 12. If the reception at the Wi-Fi module 12 is better than the reception at the Wi-Fi module 11 (Yes at step S4), the switching part 60d changes the Wi-Fi module from the Wi-Fi module 11 to the Wi-Fi module 12, and receives the signal (actual data such as moving picture) by the Wi-Fi module 12 (step S5). Next, the switching part 60d prepares to connect to the next access point 3 by the Wi-Fi module 11 (step S6). Subsequently, the switching part 60d seamlessly receives the signals (actual data such as moving picture) using the Wi-Fi modules 11 and 12 while repeating the similar process until the IG power or the ACC power is turned off. If the reception at the Wi-Fi module 12 is worse than the reception at the Wi-Fi module 11 at step S4 (No at step S4), the switching part 60d repeatedly checks the reception at the Wi-Fi module 11 and the reception at the Wi-Fi module 12.

Next, an example in which the communication route is switched on the basis of the order of priority of the in-vehicle router 1 is described. The priority controller 60e of the in-vehicle router 1 controls the narrow-range communication module 10A and the wide-range communication module 10B on the basis of the order of priority of the communication that is set in advance. The priority controller 60e sets the order of priority as follows from the high to low order: the ITS module 15, the Wi-Fi modules 11 and 12, the mobile LTE module 18, and the Bluetooth modules 13 and 14. The priority of the ITS module 15 is the highest because the ITS module 15 is used for the automated driving or the like. The priority of the Wi-Fi modules 11 and 12 is the second because the Wi-Fi modules 11 and 12 are preferably used in order to save the communication expenses for the Internet connection. The priority of the mobile LTE module 18 is the third because the mobile LTE module 18 is used in the case where the Wi-Fi modules 11 and 12 cannot connect to the Internet. The priority of the Bluetooth modules 13 and 14 is the fourth because the temporary failure of the connection to the mobile terminal, the sensor S, or the like does not substantially lead to a problem. Note that the priority of the V2X module 16 and the GPS module 19 is, for example, equal to that of the ITS module 15 and the priority of the NFC module 17 is, for example, equal to that of the Bluetooth modules 13 and 14. Note that the order of priority can be changed. For example, the order of priority may be changed by a driver. In addition, the order of priority may be determined so that the communication by the mobile LTE module 18 is not performed and the communication is restricted to the communication by the Wi-Fi modules 11 and 12.

Figure 6:
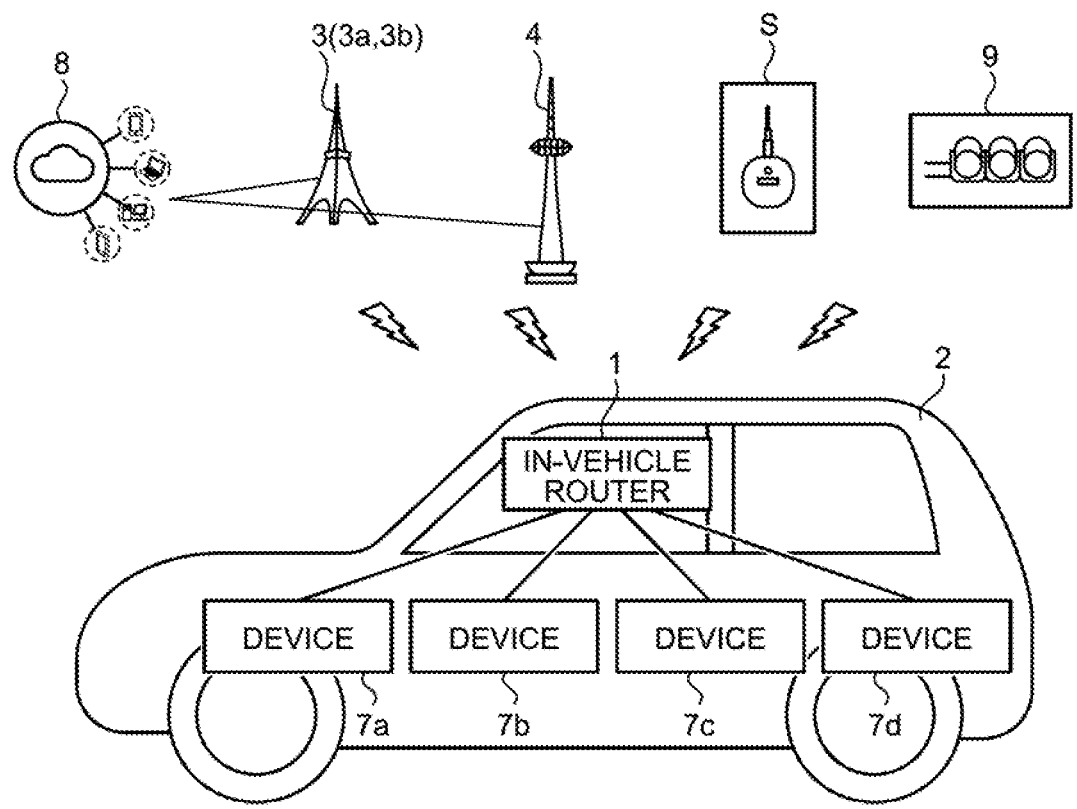
FIG. 6 is a diagram illustrating an example in which a communication route of the wireless communication device according to one embodiment is switched.

The priority controller 60e performs the communication on the basis of the order of priority. Here, the vehicle 2 includes, for example, the devices 7a to 7d as illustrated in FIG. 6. For example, if there is a request to transmit the transmission signal to the road-side device 9 through the ITS module 15 from the device 7a while the communication is performed by the device 7b through the Wi-Fi module 11, the priority controller 60e prioritizes the transmission process by the ITS module 15 over the communication by the Wi-Fi module 11 on the basis of the order of priority. For example, the priority controller 60e transmits the packet of the ITS data transmitted from the ITS module 15 with priority over the packet of the Wi-Fi data transmitted from the Wi-Fi module 11. In this manner, the priority controller 60e controls each communication module 10 on the basis of the order of priority of the data.

For example, if the signal is received through the ITS module 15 from the device 7a while the communication with the sensor S (see FIG. 6) is performed by the device 7c through the Bluetooth module 13, the priority controller 60e prioritizes the reception process by the ITS module 15 over the communication by the Bluetooth module 13 on the basis of the order of priority. For example, the priority controller 60e receives the packet of the ITS data output from the ITS module 15 with priority over the packet of the Bluetooth data output from the Bluetooth module 13.

If the communication through the Wi-Fi modules 11 and 12 by the device 7b has failed, the priority controller 60e starts to use the mobile LTE module 18 instead of the Wi-Fi modules 11 and 12 on the basis of the order of priority. Thus, if the Wi-Fi connection is lost, the priority controller 60e enables the seamless communication through the mobile LTE module 18 by the device 7b. Then, when the communication through the Wi-Fi modules 11 and 12 by the device 7b has become possible, the priority controller 60e starts to use the Wi-Fi modules 11 and 12 instead of the mobile LTE module 18 on the basis of the order of priority. Thus, the priority controller 60e can save the communication expenses. In this manner, the priority controller 60e controls each communication module 10 on the basis of the order of priority of the communication modules 10.

In addition, the priority controller 60e may additionally set the order of priority in the occurrence of emergency. For example, the priority controller 60e sets the order of priority at sudden braking or in emergency, for example, in the occurrence of an accident as follows in the high to low order: the mobile LTE module 18, the ITS module 15, the Wi-Fi modules 11 and 12, and the Bluetooth modules 13 and 14. The priority controller 60e enables the quick emergency call by setting the highest priority for the mobile LTE module 18. For example, if the emergency call request is output from the device 7d, the priority controller 60e puts the highest priority on the communication by the mobile LTE module 18 on the basis of the order of priority for the emergency call. For example, the priority controller 60e transmits the packet of the mobile LTE data transmitted from the mobile LTE module 18 with priority over the packet of the ITS data transmitted from the ITS module 15.

Note that the priority controller 60e may control each communication module 10 in accordance with the kind of data. In this case, if the kind of data is the moving picture data whose communication data size is relatively large, for example, the priority controller 60e may use the Wi-Fi modules 11 and 12 with priority over the mobile LTE module 18. Thus, the priority controller 60e can save the communication expenses. In addition, if the kind of data is the authentication data that authenticates the occupant for the service center, the priority controller 60e may use the mobile LTE module 18 with priority over the Wi-Fi modules 11 and 12 in consideration of the communication area. Thus, the priority controller 60e can perform the authentication process for sure by using the mobile LTE module 18 with the wider communication area with priority.

Next, the setting of the security of the in-vehicle router 1 is described. The security authentication part 60f of the in-vehicle router 1 authenticates at least one of the occupant and the devices 7a to 7d before the use of the in-vehicle router 1. For example, in the in-vehicle router 1, the identification information of the devices 7a to 7d that can communicate through the in-vehicle router 1 is saved in advance in the storage unit. The security authentication part 60f performs the authentication by comparing the identification information saved in the storage unit and the identification information of the device to be connected. If the device with the same identification information as the identification information saved in the storage unit is connected, the security authentication part 60f determines the authentication has been successfully performed, and if the device with the identification information different from the identification information saved in the storage unit is connected, the security authentication part 60f determines the authentication has failed. The restriction part 60g restricts the use of each communication module 10 on the basis of the authentication result from the security authentication part 60f. The restriction part 60g enables the communication without a restriction if the authentication has been successfully performed. If the authentication has failed, the restriction part 60g notifies the service center or the other devices 7a to 7d and restricts the communication between the devices 7a to 7d, thereby securing the security.

The in-vehicle router 1 may restrict the connection by face authentication. In this case, in the in-vehicle router 1, the face image of the occupant that can use the in-vehicle router 1 is saved in advance in the storage unit. Then, the security authentication part 60f of the in-vehicle router 1 captures the face of the occupant who is going to get in the vehicle 2 with the camera 5, and compares the captured face image of the occupant and the face image saved in the storage unit, thereby performing the authentication. If the captured face image of the occupant and the face image saved in the storage unit coincide, the security authentication part 60f determines the authentication has been successfully performed and if the captured face image of the occupant and the face image saved in the storage unit do not coincide, the security authentication part 60f determines the authentication has failed. The restriction part 60g does not restrict the communication if the authentication has been successfully performed, and restricts the communication if the authentication has failed. In the case of restricting the communication, for example, the restriction part 60g restricts the Internet connection or update of software in the devices 7a to 7d in the vehicle. Thus, in the case where the authentication of the face image has failed, the restriction part 60g restricts the communication of the data that interrupts the driving, thereby enhancing the security. Note that if the captured face image of the occupant and the face image saved in the storage unit do not coincide, the restriction part 60g may notify this result to the service center.

The in-vehicle router 1 may restrict the connection by the mobile terminal. In this case, in the in-vehicle router 1, the identification information of the mobile terminal of the occupant that can use the in-vehicle router 1 is saved in advance in the storage unit. Then, the security authentication part 60f of the in-vehicle router 1 acquires the identification information of the mobile terminal of the occupant who is going to get in the vehicle 2 through the NFC module 17, and compares the acquired identification number and the identification number saved in the storage unit, thereby performing the authentication. If the acquired identification number and the identification number saved in the storage unit coincide, the security authentication part 60f determines the authentication has been successfully performed and if the acquired identification number and the identification number saved in the storage unit do not coincide, the security authentication part 60f determines the authentication has failed. If the authentication has been successfully performed, the restriction part 60g does not restrict the communication, and if the authentication has failed, the restriction part 60g restricts the communication. In the case of restricting the communication, for example, the restriction part 60g restricts the Internet connection or update of software in the devices 7a to 7d in the vehicle. Note that if the acquired identification number and the identification number saved in the storage unit do not coincide, the restriction part 60g may notify this result to the service center. The security authentication part 60f and the restriction part 60g may perform the authentication process and cancel the restriction before the occupant gets in the vehicle 2 through the cloud. Thus, the in-vehicle router 1 can perform the communication right after the occupant gets in the vehicle.

As described above, the in-vehicle router 1 according to the embodiment includes the narrow-range communication module 10A, the wide-range communication module 10B, the Ethernet module 30, the CPU 60, and the housing 70. The narrow-range communication module 10A is the device capable of wireless communication. The wide-range communication module 10B is the device capable of wireless communication in the wider range than the narrow-range communication module 10A. The Ethernet module 30 is connected to the in-vehicle LAN 2b in the vehicle 2 so that communication is possible. The CPU 60 controls the narrow-range communication module 10A and the wide-range communication module 10B and communicates with the in-vehicle LAN 2b through the Ethernet module 30. To the housing 70, the narrow-range communication module 10A, the wide-range communication module 10B, the Ethernet module 30, and the CPU 60 are assembled and this housing 70 is provided to the vehicle 2.

By this structure, the in-vehicle router 1 can integrate the narrow-range communication module 10A and the wide-range communication module 10B and the communication modules 10 can be mounted in the limited space in the vehicle 2 and thus, the mount property can be improved. In addition, the in-vehicle router 1 can reduce the wire for connecting each communication module 10 and the CPU 60, and thus, reduce the weight. Since the in-vehicle router 1 can reduce the wire, the risk of falsification of the communication data can be suppressed. The in-vehicle router 1 can centrally manage the narrow-range communication module 10A and the wide-range communication module 10B by the CPU 60, the communication route of each communication module 10 can be secured as appropriate, and the deterioration in communication quality can be suppressed. The in-vehicle router 1 can simplify the control of each communication module 10 by the central management. Furthermore, the in-vehicle router 1 can strengthen the security of the narrow-range communication module 10A and the wide-range communication module 10B by the central management. In this manner, the in-vehicle router 1 can control each communication module 10 as appropriate.

In the aforementioned in-vehicle router 1, the narrow-range communication module 10A includes the communication modules with the different communication standards. For example, the narrow-range communication module 10A includes the Wi-Fi module 11, the Bluetooth module 13, the ITS module 15, the V2X module 16, and the NFC module 17. The wide-range communication module 10B includes the communication modules with the different communication standards. For example, the wide-range communication module 10B includes the mobile LTE module 18 and the GPS module 19. In this manner, even if the in-vehicle router 1 includes more communication modules 10 as the communication targets increase, the communication modules 10 can be mounted in the limited space in the vehicle 2 and the mount property can be improved.

In the in-vehicle router 1, the narrow-range communication module 10A includes the Wi-Fi module 11, and the Wi-Fi module 12 with the same communication standard as the Wi-Fi module 11. The CPU 60 includes the switching part 60d that controls to connect one of the Wi-Fi module 11 and the Wi-Fi module 12 to the first access point 3a for communication relay so that communication is possible, and cause the other of the Wi-Fi module 11 and the Wi-Fi module 12 to prepare to connect to the second access point 3b for communication relay, the second access point 3b being adjacent to the first access point 3a. By this structure, if crossing over the access points 3, the in-vehicle router 1 can perform the process of searching for the next access point 3 and the authentication process in advance. Thus, when crossing over the access points 3, the in-vehicle router 1 enables the seamless communication without stopping the communication by the Wi-Fi modules 11 and 12. The in-vehicle router 1 can reduce the communication expenses as compared to the case in which the communication is performed by the mobile LTE module 18. By communicating while switching between the Wi-Fi modules 11 and 12 and the mobile LTE module 18 as appropriate, the in-vehicle router 1 can cover the area where the mobile LTE module 18 cannot communicate, and enlarge the communication area.

In the in-vehicle router 1, the CPU 60 includes the priority controller 60e that controls the narrow-range communication module 10A and the wide-range communication module 10B on the basis of the order of priority of communication that is set in advance. By this structure, the in-vehicle router 1 can transmit the data with higher priority (for example, ITS data) with priority and thus can enhance the safety of the vehicle 2. By prioritizing the communication module with higher priority (for example, Wi-Fi module 11 or 12), the in-vehicle router 1 can reduce the communication expenses.

In the in-vehicle router 1, the CPU 60 includes the security authentication part 60f and the restriction part 60g. The security authentication part 60f authenticates at least one of the occupant and the devices 7a to 7d before the use. The restriction part 60g restricts the use of the narrow-range communication module 10A and the wide-range communication module 10B on the basis of the authentication result from the security authentication part 60f. By this structure, the in-vehicle router 1 can restrict the use of the communication modules 10 by one authentication, thereby simplifying the authentication process. By the authentication process, the in-vehicle router 1 can enhance the security thereof.

Modification

Next, a modification of the embodiment is described. In the example described above, the narrow-range communication module 10A includes the communication modules, for example the Wi-Fi modules 11 and 12 and the Bluetooth modules 13 and 14; however, the narrow-range communication module 10A only needs to include at least one communication module. Similarly, the wide-range communication module 10B includes the communication modules, for example the mobile LTE module 18 and the GPS module 19 in the above example; however, the wide-range communication module 10B only needs to include at least one communication module.

In the above example, the list of access points 3 is saved in the storage unit of the in-vehicle router 1; however, the present invention is not limited to this example. The list of access points 3 may be saved in the cloud that the in-vehicle router 1 can access, for example. In this case, the in-vehicle router 1 may acquire the list of access points 3 that can be accessed from the cloud on the basis of the information about the current position obtained by the GPS module 19. The in-vehicle router 1 can perform the connection process quickly by selecting the access point 3 from the acquired list and connecting the selected access point 3. In addition, the in-vehicle router 1 may save the access points 3 that have been connected in the past and the positional information together in the storage unit. In this case, when the vehicle passes the same place again, the in-vehicle router 1 can select the access point 3 from the list of access points 3 that have been connected in the past and connect the selected access point 3, thereby performing the connection process quickly. Moreover, the in-vehicle router 1 may update the list of access points 3 in the storage unit through the NFC module 17.

In the in-vehicle router 1, a broadcast antenna for receiving airwaves, for example radio or television, a tuner for selecting the station for the airwaves received with the broadcast antenna and converting the signals, and a switching hub used for the connection to the devices 7a to 7d in the vehicle may be assembled to the housing 70. In this case, the in-vehicle router 1 can make the coaxial line to connect between the broadcast antenna and the tuner relatively short. By making the coaxial line relatively short, the in-vehicle router 1 can reduce the influence of the noise on the coaxial line and suppress the deterioration in communication quality. In addition, the in-vehicle router 1 receives the airwaves with the broadcast antenna and converts the signal of the airwaves with the tuner within the same housing 70; therefore, it is unnecessary to use an amplifier for amplifying the signal that attenuates in the coaxial line. Note that the broadcast antenna is assembled to the outside or inside of the housing 70.

In the above example, the in-vehicle router 1 is connected to the in-vehicle LAN 2b through the Ethernet module 30; however, the present invention is not limited to this example and a connection module with another communication protocol may be used. For example, the in-vehicle router 1 may be connected to the in-vehicle LAN 2b through a CAN (Controller Area Network) module, a FlexRay module, a MOST (Media Oriented Systems Transport) module, or the like. Note that "FlexRay" and "MOST" are the registered trademarks. In the above example, the in-vehicle router 1 is connected to the in-vehicle LAN 2b with a wire; however, the in-vehicle router 1 may be connected to the in-vehicle LAN 2b without a wire.

The in-vehicle router 1 may have other module than the communication modules 10 and the Ethernet module 30 assembled to the housing 70. For example, the in-vehicle router 1 may have the following modules assembled to the housing 70: a USB (Universal Serial Bus) module, an HDMI (High-Definition Multimedia Interface) module, a GVIF (Gigabit Video Interface) module, an APIX (Automotive Pixel Link) module, a TransferJet module, a WiGig (Wireless Gigabit) module, an RFID (Radio Frequency Identifier) module, a satellite phone module, a sound output unit, and the like. Note that "HDMI", "GVIF", "TransferJet" and "WiGig" are the registered trademarks.

The in-vehicle router 1 may adjust the communication band of each communication module 10. For example, the in-vehicle router 1 may enlarge the communication bandwidth when transmitting the image capture signal obtained by the camera 5, and reduce the communication bandwidth when communicating through the ITS module 15. In addition, if the communication data quantity from each communication module 10 increases and the communication band is insufficient, the in-vehicle router 1 may restrict the particular communication so as to secure the communication band. For example, if there is a request for receiving the moving picture data while the communication is performed for updating the software, the in-vehicle router 1 may prioritize the communication for updating the software and restrict the communication for the moving picture data.

The in-vehicle router 1 may use the function of the mobile LTE module of the occupant's mobile terminal (for example, smartphone) instead of the mobile LTE module 18 of the in-vehicle router 1. For example, the in-vehicle router 1 may achieve the tethering function of the mobile LTE module of the occupant's mobile terminal by the mobile LTE module 18 of the in-vehicle router 1.

The in-vehicle router 1 may be set by the occupant's mobile terminal. In this case, the occupant registers the setting information of the in-vehicle router 1 in advance in the mobile terminal by operating the application of the mobile terminal or the like. The in-vehicle router 1 saves the identification information of the occupant who can use the in-vehicle router 1 in advance in the storage unit. Then, the in-vehicle router 1 acquires the identification information of the occupant's mobile terminal through the NFC module 17, and compares the acquired identification number and the identification number saved in the storage unit, thereby performing the authentication. Then, if the acquired identification number and the identification number saved in the storage unit coincide, the in-vehicle router 1 allows the setting of the in-vehicle router 1. Next, the in-vehicle router 1 acquires the setting information registered in the mobile terminal, and sets the in-vehicle router on the basis of the acquired setting information. Note that the in-vehicle router 1 may be set by voice through the microphone 6 or the in-vehicle router 1.

The wireless communication device according to the present embodiments can integrate the narrow-range communication module and the wide-range communication module and thus, the mount property can be improved. In addition, the wireless communication device can centrally manage the narrow-range communication module and the wide-range communication module by the controller; therefore, the communication modules can be controlled as appropriate.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communication device comprising:
a narrow-range communication module capable of wireless communication;
a wide-range communication module capable of wireless communication in a wider range than the narrow-range communication module;
a connection part connected to a communication network in a vehicle so that communication is possible;
a controller that controls the narrow-range communication module and the wide-range communication module and communicates with the communication network through the connection part; and
a housing to which the narrow-range communication module, the wide-range communication module, the connection part, and the control unit are assembled, the housing being to be provided to the vehicle, wherein
the controller includes a priority controller that controls the narrow-range communication module and the wide-range communication module on the basis of an order of priority of communication that is set in advance,
the priority controller controls the narrow-range communication module and the wide-range communication module in accordance with the kind of communication data as the order of priority,
the narrow-range communication module includes a first narrow-range communication module and a second narrow-range communication module with the same communication standard as the first narrow-range communication module, and
the controller includes a switching part that controls to connect one of the first narrow-range communication module and the second narrow-range communication module to a first access point for communication relay so that communication is possible, and cause the other of the first narrow-range communication module and the second narrow-range communication module to prepare to connect to a second access point for communication relay, the second access point being adjacent to the first access point.

2. The wireless communication device according to claim 1, wherein
the narrow-range communication module includes a plurality of communication modules with different communication standards, and
the wide-range communication module includes a plurality of communication modules with different communication standards.

3. The wireless communication device according to claim 2, wherein
if the kind of data is the communication data whose data size is relatively large, the priority controller prioritizes the narrow-range communication module over the wide-range communication module.

4. The wireless communication device according to claim 2, wherein
if an emergency call request indicating an emergency of the vehicle is input to the priority controller, the priority controller controls the narrow-range communication module and the wide-range communication module on the basis of an order of priority for an emergency call provided separately.

5. The wireless communication device according to claim 2, wherein
the controller includes an authentication part that authenticates at least one of an occupant and a connection device before use, and a restriction part that restricts use of the narrow-range communication module and the wide-range communication module on the basis of an authenticated result by the authentication part.

6. The wireless communication device according to claim 1, wherein
if the kind of data is the communication data whose data size is relatively large, the priority controller prioritizes the narrow-range communication module over the wide-range communication module.

7. The wireless communication device according to claim 1, wherein
if an emergency call request indicating an emergency of the vehicle is input to the priority controller, the priority controller controls the narrow-range communication module and the wide-range communication module on the basis of an order of priority for an emergency call provided separately.

8. The wireless communication device according to claim 1, wherein
the controller includes an authentication part that authenticates at least one of an occupant and a connection device before use, and a restriction part that restricts use of the narrow-range communication module and the wide-range communication module on the basis of an authenticated result by the authentication part.

* * * * *